May 22, 1956   R. VALVERDE   2,747,054
FRICTION THERMOSTAT
Filed Dec. 17, 1953

INVENTOR.
Robert Valverde
BY Emery, Varney,
Whittemore & Dix.
ATTORNEYS

2,747,054

FRICTION THERMOSTAT

Robert Valverde, New York, N. Y.

Application December 17, 1953, Serial No. 398,670

14 Claims. (Cl. 200—138)

This invention relates to miniature thermostats operating with a friction couple snap action.

A miniature thermostat may be defined as occupying not over one-half cubic inch of space. Although this value is given by way of illustration, the invention is particularly concerned with constructions that make such small thermostats practical.

In this friction type of thermostat the creep action of the usual thermal motor is opposed by the rubbing of two surfaces together to produce a friction couple. Static friction is greater than moving friction so that the operation of the electrical contacts is not gradual but a stop and a start. This is known as a "friction couple" snap action.

A miniature thermostat attempts to control an electric heating system, called an oven in general, within two temperature limits; and to do it constantly in spite of adverse ambient conditions. Such conditions are vibration, centrifugal and gravitational forces, contaminated air, barometric changes and also extremes of ambient temperature when not in use.

In most cases it is desirable that the ON and OFF temperatures be close together. Their difference is the "differential" of the thermostat. In many cases it is desirable to set the thermostat within a few degrees, plus or minus, of a specified setting. This range is known as the "setting tolerance." Obviously the smaller the setting tolerance the more difficult is the adjustment.

After such a thermostat is adjusted for differential and setting, it is given an accelerated life run and rechecked for acceptance. Thus it is important in a miniature thermostat that the construction be such that the microscopic adjustments can be readily obtained and that they maintain themselves.

It is an object of this invention to provide an improved friction couple, snap-action thermostat which can be made in small sizes for miniature thermostats; which can be readily set to close operating specifications; and which will continue to give satisfactory operation regardless of surrounding conditions.

Figure 1:
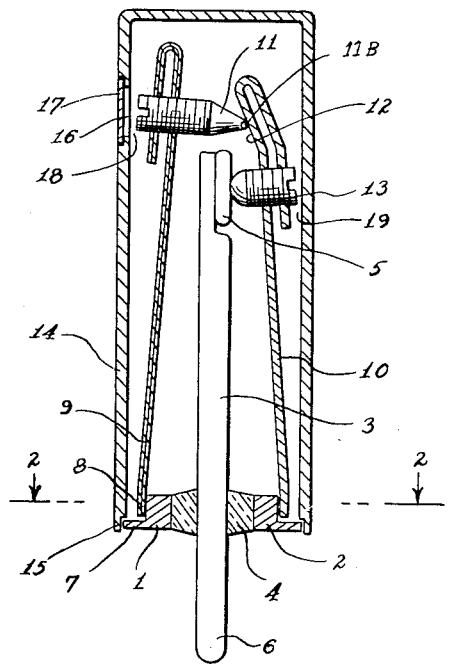
Fig. 1 shows a cross-section of the thermostat of this invention enclosed in a capsule.
Figure 2:
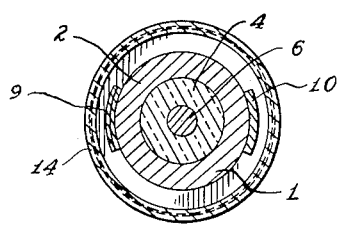
Fig. 2 is a plan view on the line 2—2 of Fig. 1, showing a cross-section of the hermetic seal header, with attached metal strips.

The thermostat is built on hermetic header 1 consisting of a metal washer 2 holding a metal pin 3 electrically insulated from the washer 2 by fused glass 4 which both supports and hermetically seals the pin 3 in the washer 2. An electrical contact 5 is welded to one end of the pin 3; the other end serving as a terminal 6. The washer 2 has a flange 7 and a shank or step 8 to which is welded a bimetal strip 9 and a metal contact strip 10, diametrically opposite each other and with the strip 10 facing the contact 5. The strips 9 and 10 converge toward their upper ends along at least a portion of their length.

The free end of the bimetal strip 9 is folded back upon itself, pierced and threaded to take a fine temperature adjustment screw 11. The screw 11 is shown tipped with a movable sapphire ball 11B which serves as an insulator to prevent the bi-metal from carrying current and to further reduce the differential while maintaining snap action.

The free end of contact strip 10 is folded back upon itself to produce a lip 12, and this strip 10 is similiarly pierced and threaded to take a differential adjustment screw 13 which contacts with the contact 5 carried by the pin 3. A cylindrical metal capsule 14 has an open end 15 which is counterbored, and has also a hole 16 for access to the adjusting screw 11. The hermetic header 1 seats into the counterbore of the open end 15 and is soldered hermetically in place. Into the hole 16 is soldered a disc 17 to complete the hermetic sealing of the capsule. The washer 2 or capsule 14 serve as the other terminal of the thermostat. The positions of the strips 9 and 10 and the pin 3 leave clearances 18 and 19 between the strips and the sides of the capsule, and these clearances are such that flexing of the strips will not bend them permanently within the confines of the capsule. If the thermostat is normally closed the screw 11 does not touch the lip 12 until the heating reaches the opening temperature or OFF position. Hence the screw 11 is the temperature adjusting screw.

This thermostat, therefore, is built on a compression seal header carrying parts which are hermetically sealed into a cylindrical metal capsule. The capsule serves to limit the flexing of the movable elements under adverse ambient conditions. Beside this, the metal capsule is thermally a part of the bimetal motor and this materially increases the speed of response of the bimetal to changes in ambient temperature.

I have discovered that the differential varies directly with the electrical contact pressure. Hence it becomes important that the contact pressure be precisely and readily adjusted. This invention permits ready access to and precise adjustment of the fine pitch contact screw 13 before mounting in the capsule 14. Being at the free end of the strip 10, the specified small contact pressure can be most readily obtained.

The warping of bimetal strip 9 makes the extended screw 11 touch the tip 12 with a wiping motion. Further motion initiates the friction couple and changes the gradual motion to a snap action to cleanly open the contacts. The location of the screw 11 on the free end of bimetal strip 9 permits maximum ease of adjustment.

Adjustment of temperature setting screw 11 does not change the differential. Hence no differential adjustment hole need be provided in the capsule. To exceed the normal current capacity of this thermostat on loads involving "inrush" current, like lamp loads, the lip 12 is further sloped with regard to the motion of the tip of screw 11 as shown in the drawing.

The surfaces of the friction couple are preferably coated with a solid lubricant, such as molybdenum disulfide, or graphite. This reduces the friction and the reduction in friction makes the differential of the thermostat less.

The solid lubricant is applied to the contact strip lip 12 and the point of temperature adjustment set screw 11. With the solid lubricant, this invention has obtained perfect commutation with a differential of 1° F. and a contact pressure of 5 grams. After a life run, the change in differential is negligible.

The basic design of a bimetal strip with a screw mounted in the free end pressing the free end of an opposing strip and a contact screw away from a fixed contact between these strips, and in which the screw on the bimetal strip is beyond the contact strip screw, permits of obvious variations within the scope of the claims.

What is claimed is:

1. A thermostat built on a compression type hermetic header having a cylindrical shoulder on one side, a pin extending through the header and having a greater length on one side of the header than on the other, a fixed electrical contact on the longer end of the pin, a bimetal strip and a movable contact strip opposite each other and attached at their lower ends to the cylindrical shoulder of the header and extending lengthwise of the pin, the bimetal strip having a free end with threads therein, a set screw held in said threads, and extending toward the movable contact strip and of a length to bear against the movable contact strip when the bimetal has warped beyond a predetermined position, and an extension on the contact strip carrying the surface against which the screw bears, said surface extending in a direction to have a wiping movement on the screw as the movable element moves toward and from the pin to produce a friction couple that gives snap action to the thermostat.

2. The thermostat described in claim 1, and in which the header is seated in and soldered to a counterbored open end of a metal capsule.

3. The thermostat described in claim 1, and in which the header is located in and soldered to the counterbore of a metal capsule and the metal capsule has an opening located in position to provide access to the screw carried by the bimetal, and means hermetically sealing the access opening.

4. A thermostat comprising a metal housing having a side wall and an end wall, a terminal pin extending through the end wall and electrically insulated from the side wall, an electrical contact on the pin within the housing and at a distance from the end wall, a movable contact-carrying element within the housing and extending lengthwise of the pin, another electrical contact on the contact-carrying element and movable therewith into and out of contact with the electrical contact on the pin to close and open the electric circuit of the thermostat, and a bimetal element in the housing and extending lengthwise of the pin and insulated from the electrical circuit of the thermostat and having one end in the thermal circuit of the side wall, the bimetal element and the contact-carrying element having surfaces contacting one another and extending in directions to have sliding movement on one another to produce a friction couple that gives snap action to the thermostat as the contact-carrying element moves toward and from the electrical contact on the pin.

5. The thermostat described in claim 4, in which the bimetal element and the contact-carrying element have an adjustable contact carried by one of them in position to bear against the other during at least a portion of the travel of the free end of the bimetal element, and in which there is an opening in the side wall of the housing through which the adjustable contact can be adjusted after the thermostat is assembled.

6. The thermostat described in claim 4, and in which one of the electrical contacts of the contact-carrying element and the terminal pin is adjustable toward and from the other independently of the contact-carrying element and the terminal pin.

7. The thermostat described in claim 4, and in which the bimetal element and the contact-carrying element are located on opposite sides of the pin and extend at an acute angle to one another to a region of contact beyond the end of the pin with the housing, and in which at least one of said elements has an adjustable abutment thereon which contacts with the other of said elements during at least a portion of the movement of the bimetal element.

8. A thermostat comprising a metal housing having a side wall and an end wall in the same thermal circuit with one another, a terminal pin carried by and extending through the end wall and electrically insulated from the end wall, an electrical contact on the pin within the housing and at a distance from the end wall, a bimetal element in the housing and extending lengthwise of the pin and insulated from the electrical circuit of the thermostat and carried by the end wall and in thermal contact with the end wall, a movable contact-carrying element within the housing and extending lengthwise of the pin, and also carried by the end wall and in the electric circuit with the end wall, and another electrical contact on the contact-carrying element and movable therewith into and out of contact with the electrical contact on the pin to close and open the electric circuit of the thermostat, the contact carrying element having a friction couple resisting movement of said contact carrying element to produce a snap action to the thermostat as the contact-carrying element moves toward and from the electrical contact on the pin.

9. The thermostat described in claim 8, and in which the end wall that carries the terminal pin, bimetal element, and contact-carrying element is hermetically sealed to the housing and in which the bimetal element and contact-carrying element have an adjustable contact with the other element during at least a portion of the travel of the bimetal element, and in which the housing has an opening through which the adjustable abutment can be adjusted after the thermostat is assembled, and means hermetically sealing said opening.

10. The thermostat described in claim 8 with the entire housing hermetically sealed, and with an adjustable contact on the contact-carrying element for adjusting the differential of the thermostat.

11. A friction couple thermostat with an adjustable bimetal strip and a second strip mounted opposite each other on a shank of a header, a terminal pin at the middle of the header and electrically insulated from the header and carrying on one end a current contact at a location between the bimetal strip and the second strip, a second current contact comprising a screw on the second strip in position to touch the terminal pin contact when the thermostat circuit is closed, a screw on the free end of the bimetal strip in position to contact with the second strip beyond the current contacts, when the bimetal strip is heated, to set up a friction couple and move the screw contact of the second strip away from the current contact of the pin with a snap action.

12. The friction couple thermostat described in claim 11, with the contacting surfaces of the friction couple coated with a solid lubricant.

13. A thermostat having a friction couple snap action, and in which the rubbing surfaces of the friction couple are plated with a solid lubricant of molybdenum disulfide or graphite.

14. A thermostat as in claim 11 with the free end of the bimetal strip carrying a set screw tipped with a ball movably retained in the tip.

References Cited in the file of this patent

UNITED STATES PATENTS

| | | |
|---|---|---|
| 2,102,407 | Dann | Dec. 14, 1937 |
| 2,140,147 | Vroom | Dec. 13, 1938 |
| 2,440,025 | Singleton | Apr. 20, 1948 |
| 2,463,891 | Malone | Mar. 8, 1949 |
| 2,602,129 | Valverde | July 1, 1952 |